(12) United States Patent
Seller

(10) Patent No.: US 8,265,188 B2
(45) Date of Patent: Sep. 11, 2012

(54) RADIO TRANSMITTER APPARATUS

(75) Inventor: Olivier Seller, Auribeau sur Siagne (FR)

(73) Assignee: Cambridge Silicon Radio Limited, Cambridge (GB)

( * ) Notice: Subject to any disclaimer, the term of this patent is extended or adjusted under 35 U.S.C. 154(b) by 139 days.

(21) Appl. No.: 12/884,561

(22) Filed: Sep. 17, 2010

(65) Prior Publication Data
US 2011/0080974 A1 Apr. 7, 2011

(30) Foreign Application Priority Data
Oct. 6, 2009 (GB) .................................. 0917452.5

(51) Int. Cl.
*H04B 7/02* (2006.01)
*H04L 1/02* (2006.01)

(52) U.S. Cl. ........ 375/267; 375/260; 375/299; 375/347; 375/349; 375/346; 455/500; 455/101

(58) Field of Classification Search .................. 375/267, 375/260, 299, 347, 349, 346; 455/500, 101
See application file for complete search history.

(56) References Cited

U.S. PATENT DOCUMENTS

| | | | | |
|---|---|---|---|---|
| 6,442,214 | B1 * | 8/2002 | Boleskei et al. | 375/299 |
| 7,092,450 | B1 * | 8/2006 | Al-Dhahir | 375/267 |
| 7,286,604 | B2 * | 10/2007 | Shattil | 375/260 |
| 7,400,687 | B2 * | 7/2008 | Matsumoto et al. | 375/260 |
| 7,680,211 | B1 * | 3/2010 | von der Embse | 375/299 |
| 7,684,527 | B2 * | 3/2010 | Yokoyama | 375/347 |

\* cited by examiner

*Primary Examiner* — Phuong Phu
(74) *Attorney, Agent, or Firm* — RatnerPrestia

(57) ABSTRACT

Radio transmitter apparatus for transmitting data over a radio channel, the apparatus comprising an encoder for encoding the data to be transmitted to generate a first symbol, a processor for calculating from the first symbol a second symbol, a modulator for modulating the first symbol onto a primary carrier in a primary frequency band and for modulating the second symbol onto one or more secondary carriers in one or more secondary frequency bands and a transmitter for transmitting the primary carrier and the one or more secondary carriers over the radio channel, wherein the one or more secondary frequency bands are selected such that if aliasing occurs in a receiver receiving the signal an alias associated with the one or more modulated secondary carriers appears in the received primary frequency band.

17 Claims, 3 Drawing Sheets

RADIO TRANSMITTER APPARATUS

FIELD OF THE INVENTION

The present invention relates to a radio transmitter apparatus and to a method of transmitting radio signals.

BACKGROUND OF THE INVENTION

There is widespread interest in telecommunications systems which permit high bandwidth signals (i.e. signals with a bandwidth greater than 500 MHz) to be transmitted using a high frequency carrier, for example a carrier in the 60 GHz range. These technologies may find application, for example, in wirelessly transmitting high definition video signals, for example from a high-definition video player to a high-definition television. Efforts have been made to improve the performance of such systems by improving reception quality, reducing transmit power and the like.

One difficulty associated with high bandwidth transmission systems lies in the fact that high-frequency analogue to digital converters (ADCs) are difficult to implement. Most digital receivers have an ADC to convert received analogue signals into a digital format for further processing in the receiver. For accurate signal reception the receiver ADC must have a sampling frequency which is at least twice the bandwidth of the transmitted signal. For high-bandwidth systems, suitable ADCs are difficult, and therefore costly, to implement.

SUMMARY

According to a first aspect of the present invention there is provided a radio transmitter apparatus for transmitting data over a radio channel, the apparatus comprising an encoder for encoding the data to be transmitted to generate a first symbol, a processor for calculating from the first symbol a second symbol, a modulator for modulating the first symbol onto a primary carrier in a primary frequency band and for modulating the second symbol onto one or more secondary carriers in one or more secondary frequency bands and a transmitter for transmitting a signal comprising the modulated primary carrier and the one or more modulated secondary carriers over the radio channel, wherein the one or more secondary frequency bands are selected such that if aliasing occurs in a receiver receiving the signal an alias associated with the one or more modulated secondary carriers appears in the received primary frequency band.

The radio transmitter apparatus of the present invention provides improved signal reception by incorporating symbol redundancy in a transmitted signal. Moreover, the transmitter apparatus of the present invention can be used in conjunction with prior art receivers to provide an improvement in performance, as the alias signal which appears in the received primary frequency band contains additional information about the transmitted symbols which can be used by the receiver to improve symbol reception quality. Additionally, the radio transmitter apparatus of the present invention facilitates receiver design by reducing the performance requirements in terms of sampling frequency of analogue to digital converters in receivers.

The processor may be configured to calculate a second symbol which is orthogonal to the first symbol.

Alternatively, the processor may be configured to calculate a second symbol which is in phase with the first symbol.

The encoder may be configured to generate a first pair of symbols and the processor may be configured to calculate from the first pair of symbols a second pair symbols.

The processor may be configured to calculate the negative of the complex conjugate of a second symbol of the first pair of symbols for use as a first symbol of the second pair of symbols and to calculate the complex conjugate of the first symbol of the first pair of symbols for use as a second symbol of the second pair of symbols.

The modulator may be configured to modulate part of the first symbol of the second pair of symbols and part of the second symbol of the second pair of symbols onto a first secondary carrier, and to modulate another part of the first symbol of the second pair of symbols and another part of the second symbol of the second pair of symbols onto a second secondary carrier.

The first secondary carrier may be in a higher frequency band than the primary carrier and the second secondary carrier may be in a lower frequency band than the primary carrier.

The first and second secondary carriers may be in frequency bands adjacent that of the primary carrier.

According to a second aspect of the invention there is provided a method of transmitting data over a radio channel, the method comprising encoding the data to be transmitted to generate a first symbol, calculating from the first symbol a second symbol, modulating the first symbol onto a primary carrier in a primary frequency band, modulating the second symbol onto one or more secondary carriers in one or more secondary frequency bands and transmitting the modulated primary carrier and the one or more modulated secondary carriers over the radio channel, wherein the one or more secondary frequency bands are selected such that if aliasing occurs in a receiver receiving the signal an alias associated with the one or more modulated secondary carriers appears in the received primary frequency band.

The second symbol may be orthogonal to the first symbol.

Alternatively, the second symbol may be in phase with the first symbol.

The method may comprise generating a first pair of symbols and calculating from the first pair of symbols a second pair symbols.

A first symbol of the second pair of symbols may be the negative of the complex conjugate of a second symbol of the first pair of symbols and the second symbol of the second pair of symbols may be the complex conjugate of the first symbol of the first pair of symbols.

Part of the first symbol of the second pair of symbols and part of the second symbol of the second pair of symbols may be modulated onto a first secondary carrier, and another part of the first symbol of the second pair of symbols and another part of the second symbol of the second pair of symbols may be modulated onto a second secondary carrier.

The first secondary carrier may be in a higher frequency band than the primary carrier and the second secondary carrier may be in a lower frequency band than the primary carrier.

The first and second secondary carriers may be in frequency bands adjacent that of the primary carrier.

BRIEF DESCRIPTION OF THE DRAWINGS

Embodiments of the invention will now be described, strictly by way of example only, with reference to the accompanying drawings, of which

DETAILED DESCRIPTION

Figure 1:
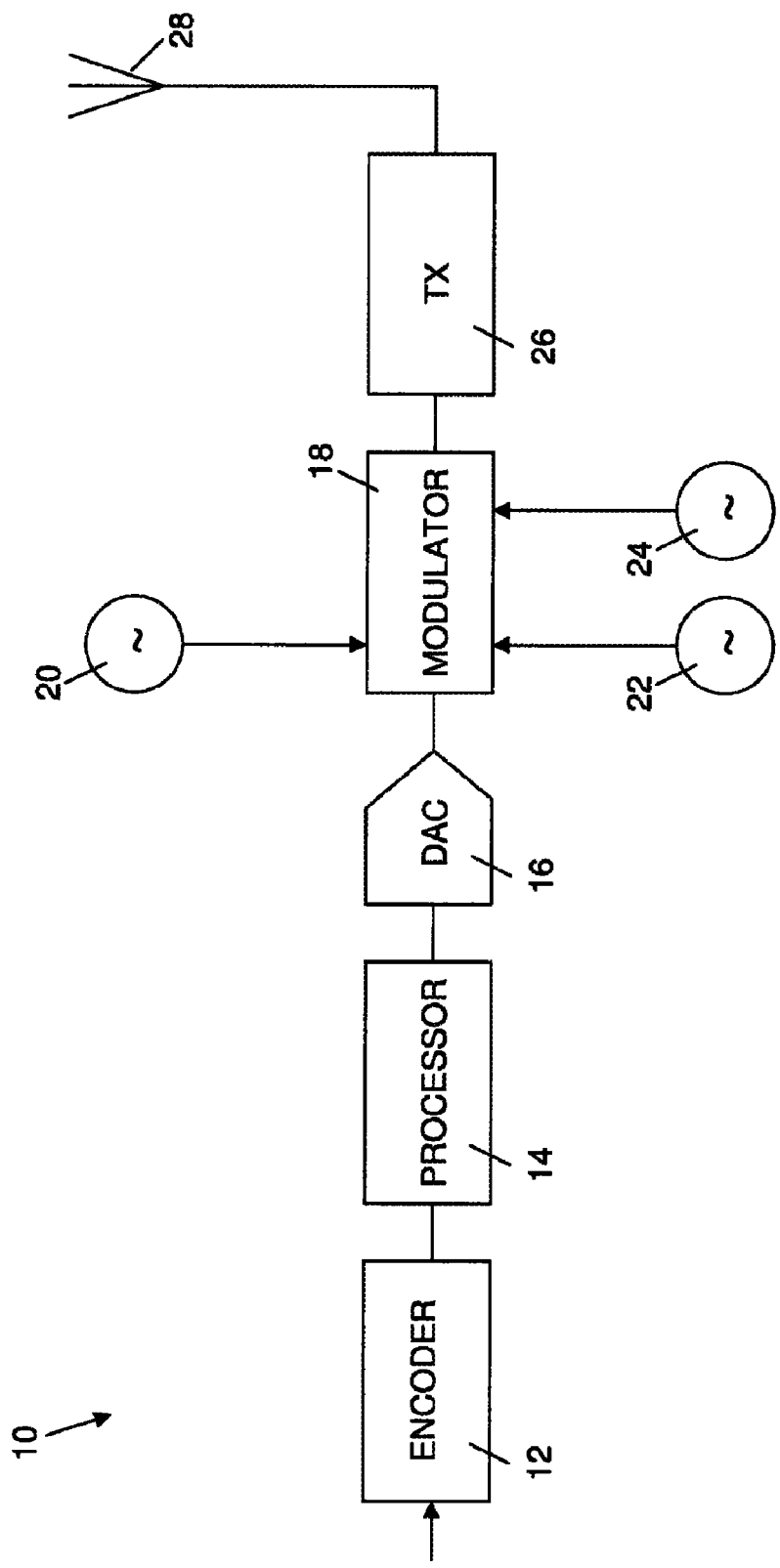
FIG. 1 is a schematic representation of a transmitter architecture.

Referring first to the schematic diagram of FIG. 1, a transmitter architecture is shown generally at 10. It will be appreciated that the functional blocks shown in FIG. 1 are not necessarily, representative of physical components of a transmitter, but are used only for the purpose of illustrating the invention. Moreover, for reasons of clarity and brevity only those components of the transmitter 10 which are relevant to the invention are illustrated, but it will be apparent to those skilled in the art that the additional components will be present in a typical transmitter apparatus.

The transmitter 10 comprises an encoder 12 which is configured to receive data to be transmitted, such as voice or image data. In one embodiment, the encoder 12 encodes this data into pairs of digital symbols. Each symbol pair is passed to a processing unit 14, where a second pair of symbols is generated based on the incoming first symbol pair, as is described in more detail below.

The first and second symbol pairs are passed to a digital to analogue converter (DAC) 16, which converts the digital symbol pairs to analogue signals suitable for transmission over a radio channel. In certain embodiments where the transmitter 10 is used for high bandwidth, high carrier frequency applications, the sampling frequency of the DAC 16 may be in the region of 2 GHz or more.

The analogue signals output by the DAC 16 are passed to a modulator 18, which modulates the analogue signal representing the first symbol pair onto a primary carrier 20 which has a frequency $f_{cprim}$ within a primary frequency band, which may be in the 60 GHz range, and modulates the analogue signal representing the second symbol pair onto one or more secondary carriers 22, 24 which have frequencies $f_{csec1}$, $f_{csec2}$ within secondary frequency bands. The frequency bands of the secondary carriers 22, 24 are selected such that if aliasing of the secondary carriers 22, 24 occurs in a receiver receiving the primary and secondary carriers 20, 22, 24, an alias of the modulated secondary carriers 22, 24 will appear in the frequency band of the received primary carrier 20 in the receiver. This helps to improve signal reception, as will be described in more detail below.

The modulated signal output by the modulator 18 is passed to a transmit unit 26, which transmits a signal including the modulated first and second carriers 20, 22, 24 over a radio channel using an antenna 28. The signal transmitted by the transmit unit 26 is transmitted using an orthogonal frequency domain multiplexing (OFDM) scheme, in which the data to be transmitted is divided into several parallel data streams which are modulated onto a number of closely spaced sub-carriers (one carrier per data stream).

The encoder 12 in this embodiment encodes data to be transmitted into symbol pairs in a manner that will be familiar to those skilled in the art. Each symbol pair $\{s_1, s_2\}$ is passed to the processing unit 14, which is configured to generate a second symbol pair for each first symbol pair received by the processing unit 14. In this example, the second symbol pair comprises the negative of the complex conjugate of the second symbol $s_2$ of the first pair of symbols and the complex conjugate of the first symbol $s_1$ of the first pair of symbols. Thus, the output of the processing unit is two orthogonal pairs of symbols:

$$\begin{Bmatrix} s_1 & s_2 \\ -s_2^* & s_1^* \end{Bmatrix}$$

The DAC 16 converts the digital first and second pairs of symbols into analogue signals that can be transmitted over a radio channel and passes the analogue signals representing the first and second symbol pairs to the modulator 18.

Figure 2:
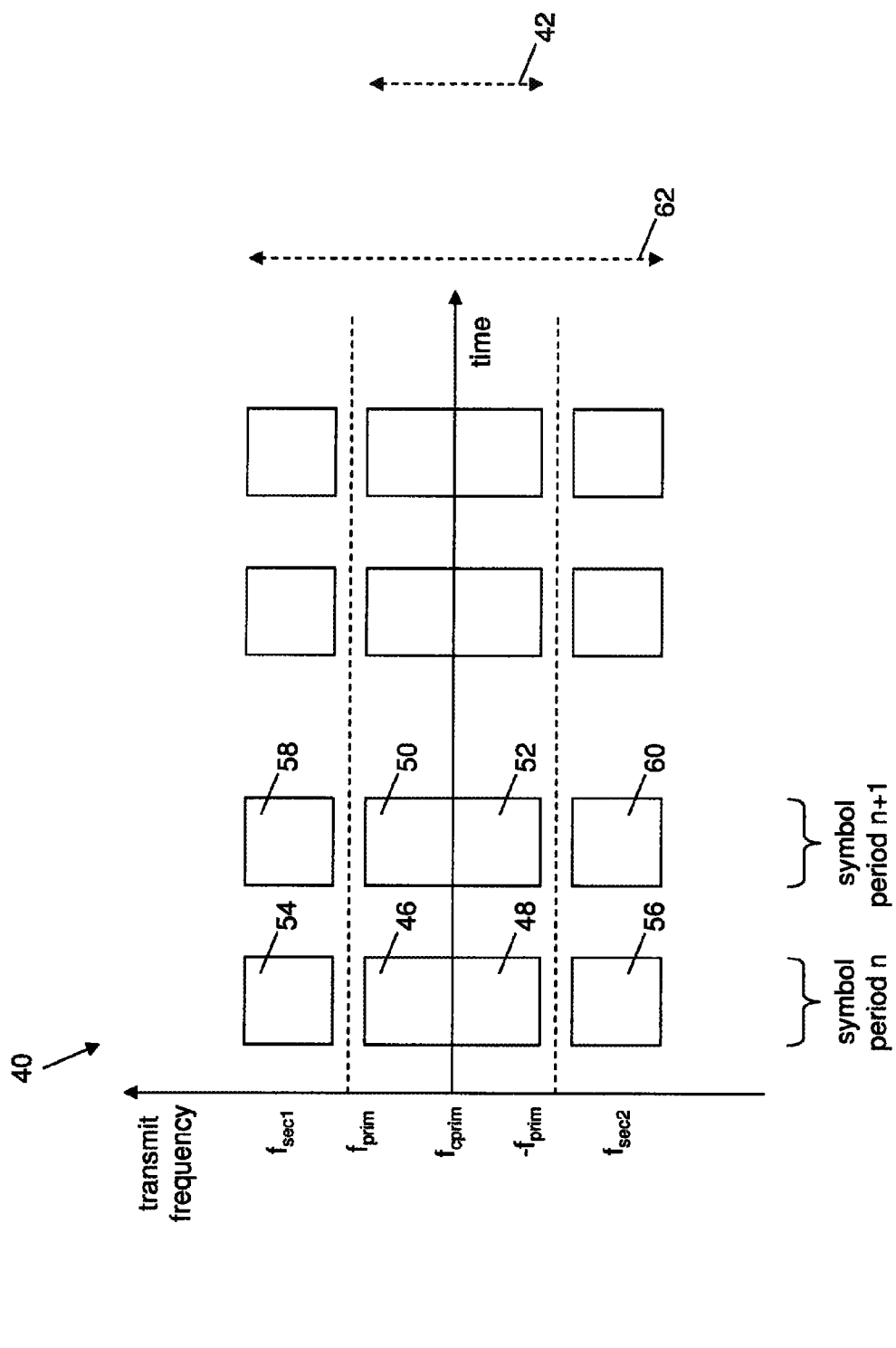
FIG. 2 is a diagram showing a representation of a frequency spectrum of a signal transmitted by a transmitter according to an embodiment of the invention.

The effect of the modulator 18 on the first and second symbol pairs is shown schematically in FIG. 2, in which a frequency spectrum of a modulated signal to be transmitted is shown generally at 40.

The modulator 18 modulates the first symbol pair $\{s_1, s_2\}$ onto the primary carrier 20 which has a frequency within a primary frequency band, indicated by the arrow 42 in FIG. 2, which may be in the 60 GHz range in some embodiments. As an OFDM modulation scheme is used to modulate $s_1$ and $s_2$ onto a number of sub-carriers the modulated symbols are transmitted on those sub-carriers.

The first symbol $s_1$ is divided into first and second parts 46, 48 which are modulated onto the primary carrier 20. The first part 46 may be regarded as a positive part of the first symbol $s_1$, whilst the second part 48 may be regarded as a negative part of the first symbol $s_1$. Thus, it can be said that $s_1 = s_{1(pos)} + s_{1(neg)}$.

The modulated first part 46 ($s_{1(pos)}$) has a frequency band which extends from the nominal frequency $f_{cprim}$ of the primary carrier 20 to a frequency $f_{prim}$ which is greater than the nominal frequency $f_{cprim}$, of the primary carrier 20. Thus, the first part 46 contains OFDM sub-carriers whose frequencies are greater than $fc_{prim}$. The modulated second part 48 ($s_{1(neg)}$) of the first symbol $s_1$ has a frequency band which extends from the nominal frequency $f_{cprim}$ of the primary carrier 20 to a frequency $-f_{prim}$ which is smaller than the nominal frequency $f_{cprim}$ of the primary carrier 20. Thus, the second part 48 contains OFDM carriers whose frequencies are smaller than $f_{cprim}$.

Similarly, the second symbol $s_2$ is divided into first and second parts 50, 52, which can be regarded as being positive and negative parts $s_{2(pos)}$ and $s_{2(neg)}$ of the second symbol $s_2$. The modulated first part 50 has a frequency band which extends from the nominal frequency $f_{cprim}$ of the primary carrier 20 to a frequency $f_{prim}$ which is greater than the nominal frequency $f_{cprim}$ of the primary carrier 20 and thus contains OFDM carriers with frequencies greater than $f_{cprim}$. The modulated second part 52 of the second symbol $s_2$ has a frequency band which extends from the nominal frequency $f_{cprim}$ of the primary carrier 20 to a frequency $-f_{prim}$ which is smaller than the nominal frequency $f_{cprim}$ of the primary carrier 20 and thus contains OFDM carriers with frequencies smaller than $f_{cprim}$.

The modulator 18 modulates the second symbol pair $\{-s_2^*, s_1^*\}$ onto the secondary carriers 22, 24. The secondary carriers 22, 24 have frequencies $f_{sec1}$ $f_{sec2}$ which are selected such that if aliasing of the secondary carriers 22, 24 occurs in a receiver receiving the primary and secondary carriers 20, 22, 24, an alias of the modulated secondary carriers 22, 24 will appear in the frequency band of the received primary carrier 20 in the receiver. Thus, the secondary carrier 22 has a frequency $f_{sec1}$ in a frequency band which is greater than that of the primary carrier 20, whilst the secondary carrier 24 has a frequency $f_{sec2}$ in a frequency band which is smaller than that of the primary carrier 20. In this example the frequency bands of the secondary carriers 22, 24 are selected as being adjacent the frequency band of the primary carrier 20, but it will be appreciated that any frequency band may be selected for the secondary carriers 22, 24 provided that it has the property that if aliasing of the secondary carriers 22, 24 occurs in a receiver images of the secondary carriers 22, 24 will appear in the received primary frequency band.

The first symbol of the second symbol pair $\{-s_2^*, s_1^*\}$ is split into two parts 54, 56, which parts are modulated onto the secondary carriers 22, 24. As the first symbol $-s_2^*$ of the second symbol pair is the negative of the complex conjugate of the second symbol $s_2$ of the first symbol pair, the parts 54, 56 of the first symbol of the second symbol pair are related to the parts of the second symbol $s_2$ of the first symbol pair. Thus, the part 54 of the first symbol of the second symbol pair can be regarded as being $-s_{2(neg)}^*$, whilst the part 56 can be regarded as being $-s_{2(pos)}^*$.

The part 54 is modulated onto the secondary carrier 22 whose frequency is $f_{sec1}$, whilst the part 56 is modulated onto the secondary carrier 24 whose frequency is $f_{sec2}$.

Similarly, the second symbol of the second symbol pair $\{-s_2^*, s_1^*\}$ is split into two parts 58, 60, which can be regarded as being $s_{1(neg)}^*$ and $s_{1(pos)}^*$ respectively. The first part 58 is modulated onto the secondary carrier 22 whose frequency is $f_{sec1}$, whilst the second part 60 is modulated onto the secondary carrier 24 whose frequency is $f_{sec2}$. Thus, the modulated signal output by the modulator 18 has a total bandwidth which is greater than the bandwidth of the modulated symbol pair $\{s_1, s_2\}$, as is indicated in FIG. 2 by the arrow 62. The modulation process performed by the modulator 18 has been described here by reference to a single symbol pair $\{s_1, s_2\}$ to be transmitted in a symbol period n, but it will be apparent that the same process is performed by the modulator 18 for each pair of symbols to be transmitted in each symbol period. As $s_1$ and $s_2$ are OFDM modulated symbols, $s_1^*$ and $-s_2^*$ are also OFDM modulated symbols, and the parts $s_{1(neg)}^*$, $s_{1(pos)}^*$ and $-s_{2(neg)}^*$, $-s_{2(pos)}^*$ each contain a subset of the OFDM carriers used to transmit the second pair of symbols $s_1^*, -s_2^*$.

A signal transmitted by the transmitter 10 can be received by any suitable receiver. In order to receive the whole of the signal transmitted by the transmitter 10, i.e. the primary and secondary transmitted signals, the receiver must have a receive bandwidth which is equal to or greater than the total bandwidth of the transmitted signal, as indicated by the arrow 62 in FIG. 2.

The receiver will include an analogue to digital converter (ADC). Typically the sampling frequency of the receiver ADC will be smaller than the total bandwidth of the transmitted signal (as indicated by the arrow 62 in FIG. 2), due to the difficulties inherent in designing high frequency ADCs. The receiver ADC typically has a sampling frequency which is equal to or greater than the bandwidth of the primary transmitted signal, as indicated by the arrow 42 in FIG. 2, and in this case the output of the receiver ADC will contain the primary signal and one or more aliases of the secondary signals, which aliases can be used to improve the quality of reception of the received primary signal, as is explained in more detail below. Of course, if the bandwidth of the receiver ADC is equal to or greater than the total bandwidth of the transmitted signal, as indicated by the arrow 62 in FIG. 2, its output will include the primary and secondary transmitted signals.

During a first symbol period the primary carrier 20 carrying the first symbol $s_1$ of the first symbol pair $\{s_1, s_2\}$ is transmitted as i data streams on i sub-carriers (due to the OFDM scheme employed by the transmit unit 28). Each of the i sub-carriers is transmitted over a separate propagation channel, within the primary frequency band. The transfer functions of the ith propagation channel can be denoted $h_{1,i}$. In the same first symbol period the secondary carriers 22, 24 carrying the first symbol $-s_2^*$ of the second symbol pair $\{-s_2^*, s_1^*\}$ are transmitted using i sub-carriers over i second propagation channels within the secondary frequency band, whose transfer functions can be denoted as $h_{2,i}$.

The received primary and secondary signals on the ith sub-carriers can be described by the following equations:

$$r_{1,i} = h_{1,i} s_{1,i} + n_{1,i}$$

$$r_{2,i} = -h_{2,i} s_{2,i}^* + n_{2,i}$$

where $r_{1,i}$ is the portion of received symbol corresponding to the transmitted symbol $s_1$ transmitted on the ith sub-carrier, $r_2$ is the received symbol corresponding to the transmitted symbol $s_2$ on the ith sub-carrier and $n_{1,i}$ and $n_{2,i}$ are noise.

Similarly, during a second symbol period the primary carrier 20 carrying the second symbol $s_2$ of the first symbol pair $\{s_1, s_2\}$ is transmitted as i data streams over i propagation channels within the primary frequency band, and the secondary carriers 22, 24 carrying the second symbol $s_1^*$ of the second symbol pair $\{-s_2^*, s_1^*\}$ are transmitted as i data streams over i propagation channels within the secondary frequency band. The received primary and secondary signals can thus be described by the following equations:

$$r_3 = h_{1,i} s_{2,i} + n_{3,i}$$

$$r_4 = h_{2,i} s_{1,i}^* + n_{4,i}$$

On receipt of these symbols, the receiver can perform a simple maximum ratio combining (MRC) operation to retrieve the transmitted symbols $s_1$, $s_2$. The receiver must first calculate an estimate of the channel impulse response $h_1$, $h_2$ for each of the propagation channels, and this is performed in a manner identical to that used in known space time block coding receivers.

To facilitate the MRC operation performed by the receiver the transmitter 10 transmits a first reference signal in the primary frequency band whilst remaining silent in the secondary frequency band. The transmitter 10 then transmits a second reference signal in the secondary frequency band whilst remaining silent in the primary frequency band. The first and second reference signals are typically transmitted at the beginning of a transmission, at a known timing. The composition of the first and second reference signals will be familiar to those skilled in the art. On receiving the first and second reference signals the receiver can estimate the channel impulse responses for the propagation channels, by comparing the signals received by the receiver to the known reference signals.

Having calculated the estimates for the channel impulse responses, the receiver can decode the received symbols $r_1, r_2, r_3, r_4$ to recover the transmitted symbols $s_1$, $s_2$. For each sub-carrier, the receiver calculates $MRC_{s1}$ and $MRC_{s2}$ as follows:

$$MRC_{s1} = h_1^* \cdot r_1 + h_2 \cdot r_4^* = (|h_1|^2 + |h_2|^2) \cdot s_1 + h_1^* \cdot n_1 + h_2^* \cdot n_4^* = (|h_1|^2 + |h_2|^2) \cdot s_1 + MRC_{n1}$$

$$MRC_{s2} = -h_2^* \cdot r_2 + h_1 \cdot r_3^* = (|h_1|^2 + |h_2|^2) \cdot s_2 + h_2^* \cdot n_2 + h_1^* \cdot n_3^* = (|h_1|^2 + |h_2|^2) \cdot s_2 + MRC_{n2}$$

In the equations above, the maximum ratio combining noise is defined as $$MRC_{n1} = h_1^* \cdot n_1 + h_2 \cdot n_4^* \text{ and}$$

$$MRC_{n2} = -h_2 \cdot n_2^* + h_1^* \cdot n_3$$

As is explained above, a signal transmitted by the transmitter 10 can be received by a receiver having in its RF front end an ADC with a lower sampling frequency than the total bandwidth of the transmitted signal. For example, the ADC of such a receiver may have a sampling frequency in the region of 1 GHz, which is not high enough accurately to sample a received signal with a bandwidth of 2 GHz. Such a situation may arise when the ADC of the receiver has not been designed specifically to receive signals transmitted by the transmitter 10.

Figure 3:
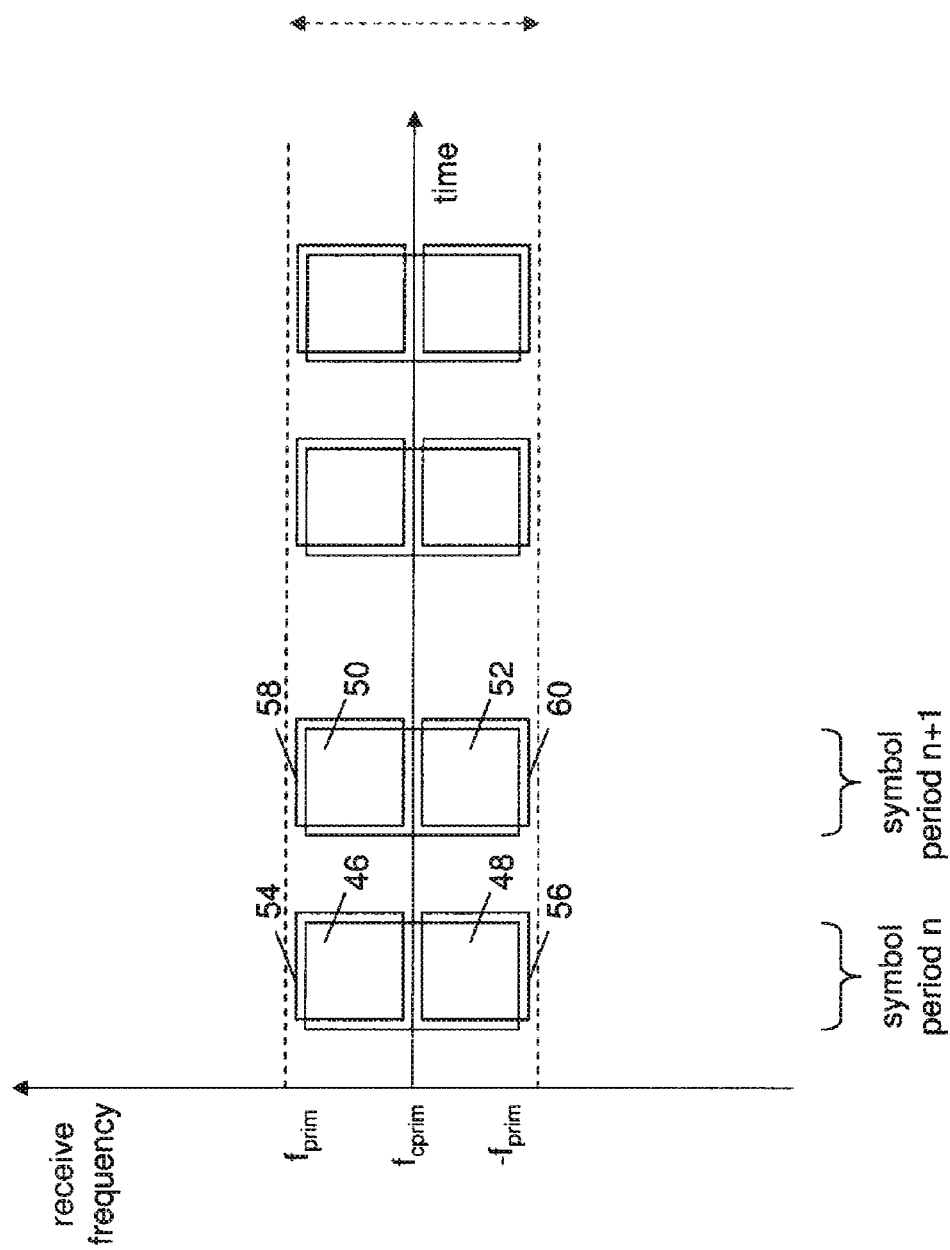
FIG. 3 is a diagram showing a representation of a frequency spectrum of a signal received from a transmitter according to an embodiment of the invention by a receiver.

FIG. 3 is a schematic representation of the received signal spectrum of the transmitted signal illustrated in FIG. 2 when this signal has been received by a receiver having an ADC sampling frequency which is less than the total bandwidth (indicated by arrow 62 in FIG. 2) of the modulated signal transmitted by the transmitter 10. In this situation, the ADC undersamples the received signal, causing aliasing to occur in the receiver. The frequency bands of the secondary carriers 22, 24 transmitted by the transmitter 10 are selected such that if aliasing occurs images (also referred to as aliases) of the secondary carriers 22, 24 appear in the primary frequency band of the receiver. This is illustrated in FIG. 3, where it can be seen that an image of the part 54 of the first symbol of the second transmitted symbol pair appears in the same frequency band in the receiver as the first part 46 of the first transmitted symbol $s_1$. Similarly, an image of the part 56 of the first symbol of the second transmitted symbol pair appears in the same frequency band in the receiver as the second part 48 of the first transmitted symbol $s_1$. In the same way, an image of the part 58 of the second symbol of the second transmitted symbol pair appears in the same frequency band as the first part 50 of the second symbol of the second transmitted symbol pair, whilst an image of the part 60 of the second symbol of the second transmitted symbol pair appears in the same frequency band as the second part 52 of the second symbol of the first transmitted symbol pair. These provide additional information on the transmitted symbols to the receiver, which is able to decode the images to improve the quality of reception of the transmitted symbols, as is described below.

In a first symbol period n the receiver receives a signal $$r_1 = h_1 s_1 + h_2(-s_2^*) + n_i.$$

The term $h_2(-s_2^*)$ arises due to aliasing of the symbols carried by the secondary carrier(s), which causes images of the secondary symbol pair to appear in the received first symbol pair.

In a second symbol period n+1, the receiver receives a signal $$r_2 = (h_1 s_2 + h_2 s_1^*) + n_2$$

The receiver performs a maximum ratio combination to calculate $MRC_{S1}$ and $MRC_{s2}$ as follows:

$$\begin{aligned} MRC_{s1} &= h_1^* \cdot r_1 + h_2 \cdot r_2^* \\ &= (|h_1|^2 + |h_2|^2) \cdot s_1 + h_1^* \cdot h_2 \cdot (-s_2^*) + \\ &\quad h_2 \cdot h_1^*(s_2^*) + h_1^* \cdot n_1 + h_2 \cdot n_2^* \\ &= (|h_1|^2 + |h_2|^2) \cdot s_1 + MRC_{n1} \end{aligned}$$

$$\begin{aligned} MRC_{s2} &= -h_2 \cdot r_1^* + h_1^* \cdot r_2 \\ &= (|h_1|^2 + |h_2|^2) \cdot s_2 + -h_2 \cdot h_1^* \cdot (s_1^*) + \\ &\quad h_1^* \cdot h_2(s_1^*) - h_2 \cdot n_1^* + h_1^* \cdot n_2^* \\ &= (|h_1|^2 + |h_2|^2) \cdot s_2 MRC_{n2} \end{aligned}$$

Maximum ration combining noise is defined as $$MRC_{n1} = h_1^* \cdot n_1 + h_2 \cdot n_2^* \text{ and}$$

$$MRC_{n2} = -h_2 \cdot n_i^* + h_1^* \cdot n_2$$

This maximum ration combining operation yields estimates for $s_1$ and $s_2$ which include the contribution of the images produced by the aliasing of the symbols carried by the secondary carrier(s) of the transmitted signal.

In an alternative embodiment, the second symbols generated by the processing unit 14 are not orthogonal to the symbols generated by the encoder 12, but are instead in phase with the symbols generated by the encoder. In this embodiment the encoder 12 need not generate digital symbols in pairs. As in the previous embodiment, the second symbols are transmitted on one or more secondary carriers at the same time as the corresponding symbols generated by the encoder 12. Where aliasing occurs in a receiver as a result of undersampling in the receiver ADC the aliases of the signals carried by the secondary carriers appear in the received primary signal and are decoded seamlessly by the receiver.

This embodiment requires a-priori knowledge of the propagation channel at the transmitter 10, since the second symbols transmitted on the secondary carrier(s) must take into account the effect of the propagation channel on the transmitted secondary carriers to ensure that the second symbols arrive at the receiver in phase with the symbols carried by the primary carrier. Methods of imputing this knowledge to the transmitter will be familiar to those skilled in the art.

In this embodiment the receiver seamlessly incorporates the additional information from the second symbols in the received secondary carrier(s) into the symbols carried by the first carrier to improve the signal to noise ratio of the received signal. No modification of the receiver is required, so a transmitter 10 of this embodiment is compatible with pre-existing receivers.

The transmitter 10 of the present invention can be embodied in discrete components, or may be integrated into a dedicated silicon chip, or programmed onto a field programmable gate array, digital signal processor or the like. Alternatively; the transmitter 10 may be provided by a software program executing on a suitably configured processor.

The invention claimed is:

1. A Radio transmitter apparatus for transmitting data over a radio channel, the apparatus comprising:
   an encoder for encoding the data to be transmitted to generate a first symbol;
   a processor for calculating from the first symbol a second symbol;
   a modulator for modulating the first symbol onto a primary carrier in a primary frequency band and for modulating the second symbol onto one or more secondary carriers in one or more secondary frequency bands; and
   a transmitter for transmitting a signal comprising the modulated primary carrier and the one or more modulated secondary carriers over the radio channel,
   wherein the one or more secondary frequency bands are selected such that if aliasing occurs in a receiver receiving the signal an alias associated with the one or more modulated secondary carriers appears in the received primary frequency band.

2. The Apparatus according to claim 1 wherein the processor is configured to calculate a second symbol which is orthogonal to the first symbol.

3. The Apparatus according to claim 1 wherein the processor is configured to calculate a second symbol which is in phase with the first symbol.

4. The Apparatus according to claim 1 wherein the encoder is configured to generate a first pair of symbols and the processor is configured to calculate from the first pair of symbols a second pair symbols.

5. The Apparatus according to claim 4 wherein the processor is configured to calculate the negative of the complex conjugate of a second symbol of the first pair of symbols for use as a first symbol of the second pair of symbols and to calculate the complex conjugate of the first symbol of the first pair of symbols for use as a second symbol of the second pair of symbols.

6. The Apparatus according to claim 5 wherein the modulator is configured to modulate part of the first symbol of the second pair of symbols and part of the second symbol of the second pair of symbols onto a first secondary carrier, and to modulate another part of the first symbol of the second pair of symbols and another part of the second symbol of the second pair of symbols onto a second secondary carrier.

7. The Apparatus according to claim 6 wherein the first secondary carrier is in a higher frequency band than the primary carrier and the second secondary carrier is in a lower frequency band than the primary carrier.

8. The Apparatus according to claim 6 wherein the first and second secondary carriers are in frequency bands adjacent that of the primary carrier.

9. A method, implemented in a transmitter, of transmitting data over a radio channel, the method comprising encoding the data to be transmitted to generate a first symbol, calculating from the first symbol a second symbol, modulating the first symbol onto a primary carrier in a primary frequency band, modulating the second symbol onto one or more secondary carriers in one or more secondary frequency bands and transmitting the modulated primary carrier and the one or more modulated secondary carriers over the radio channel, wherein the one or more secondary frequency bands are selected such that if aliasing occurs in a receiver receiving the signal an alias associated with the one or more modulated secondary carriers appears in the received primary frequency band.

10. The method according to claim 9 wherein the second symbol is orthogonal to the first symbol.

11. The method according to claim 10 wherein the second symbol is in phase with the first symbol.

12. The method according to claim 10 comprising generating a first pair of symbols and calculating from the first pair of symbols a second pair symbols.

13. The method according to claim 12 wherein a first symbol of the second pair of symbols is the negative of the complex conjugate of a second symbol of the first pair of symbols and the second symbol of the second pair of symbols is the complex conjugate of the first symbol of the first pair of symbols.

14. The method according to claim 13 wherein part of the first symbol of the second pair of symbols and part of the second symbol of the second pair of symbols are modulated onto a first secondary carrier, and another part of the first symbol of the second pair of symbols and another part of the second symbol of the second pair of symbols are modulated onto a second secondary carrier.

15. The method according to claim 14 wherein the first secondary carrier is in a higher frequency band than the primary carrier and the second secondary carrier is in a lower frequency band than the primary carrier.

16. The method according to claim 14 wherein the first and second secondary carriers are in frequency channels which are adjacent that of the primary carrier.

17. A non-transitory computer readable medium including a computer program which, when executed by a processor, causes the processor to perform the method of claim 9.

* * * * *

UNITED STATES PATENT AND TRADEMARK OFFICE
CERTIFICATE OF CORRECTION

PATENT NO. : 8,265,188 B2
APPLICATION NO. : 12/884561
DATED : September 11, 2012
INVENTOR(S) : Seller It is certified that error appears in the above-identified patent and that said Letters Patent is hereby corrected as shown below:

In the Specifications

In column 4, Line 14, delete "($S_{1(pos}$" and insert -- $S_{1(pos)}$) --, therefor.

In Column 4, Line 19, delete "$fc_{prim}$" and insert -- $f_{cprim}$ --, therefor.

In Column 7, Line 48, delete " $= (|h_1|^2 + |h_2|^2) \cdot s_2 MRC_{n2}$ " and insert -- $= (|h_1|^2 + |h_2|^2) \cdot s_2 + MRC_{n2}$ --, therefor.

In Column 7, Line 55, delete " $MRC_{n2} = -h_2 \cdot n_i^* + h_1^* \cdot n_2$ " and insert -- $MRC_{n2} = -h_2 \cdot n_1^* + h_1^* \cdot n_2$ --, therefor.

In Column 8, Line 23, delete "Alternatively;" and insert -- Alternatively, --, therefor.

Signed and Sealed this
Seventeenth Day of December, 2013

Margaret A. Focarino
*Commissioner for Patents of the United States Patent and Trademark Office*